Oct. 20, 1925.

C. E. JOHNSON

PISTON RING

Filed March 24, 1924

1,558,091

Inventor
Charles E. Johnson
By Frank E. Liverance, Jr.
Attorney.

Patented Oct. 20, 1925.

1,558,091

UNITED STATES PATENT OFFICE.

CHARLES E. JOHNSON, OF MUSKEGON, MICHIGAN, ASSIGNOR TO THE PISTON RING COMPANY, OF MUSKEGON HEIGHTS, MICHIGAN, A CORPORATION OF MICHIGAN.

PISTON RING.

Application filed March 24, 1924. Serial No. 701,245.

*To all whom it may concern:*

Be it known that I, CHARLES E. JOHNSON, a citizen of the United States of America, residing at Muskegon, in the county of Muskegon and State of Michigan, have invented certain new and useful Improvements in Piston Rings; and I do hereby declare the following to be a full, clear, and exact description of the invention, such as will enable others skilled in the art to which it appertains to make and use the same.

This invention relates to piston rings which may be used in internal combustion engines. Piston rings are used to make a seal against the passage of lubricating oil from the crank case to the combustion chamber of the engine, or the passage of gases from the combustion chamber to the crank case, each piston of an engine being equipped with a number of the rings.

My invention has, for one of its primary objects, the production of piston rings which when used in cylinders of internal combustion engines, make particularly effective seals of the character noted, being especially effective in the removal of excess oil which may be on the inner walls of the cylinders in which the rings are installed. A further object of the invention is to make a piston ring which is very economically produced in the large quantities which now must be made for the supply of the demand in the automotive industry. Many other objects and purposes than those stated will appear with novel constructions for attaining the same as understanding of the piston ring construction and method of producing the same is had from the following description, taken in connection with the accompanying drawing, in which, Fig. 1 is a plan view of a piston ring, with parts broken away and shown in section, made in accordance with the invention, the method followed for cutting the slots in the ring being shown.

Like reference characters refer to like parts in the several figures of the drawing.

The piston ring 1, preferably, is made from individual ring castings machined to size on all sides except on the inner curved side, the method followed being that disclosed in my Patent No. 1,405,517, issued Feb. 7, 1922. This method of making a piston ring so that it will be a true circle when closed at its parted side may be followed, or any other which will produce a practical piston ring, the present invention being directed to additional features and operations and methods of producing the same. The piston ring is parted at one side, as indicated at 2, and any preferred type of joint used at the parting, the well known lap-joint being shown.

Figure 1:
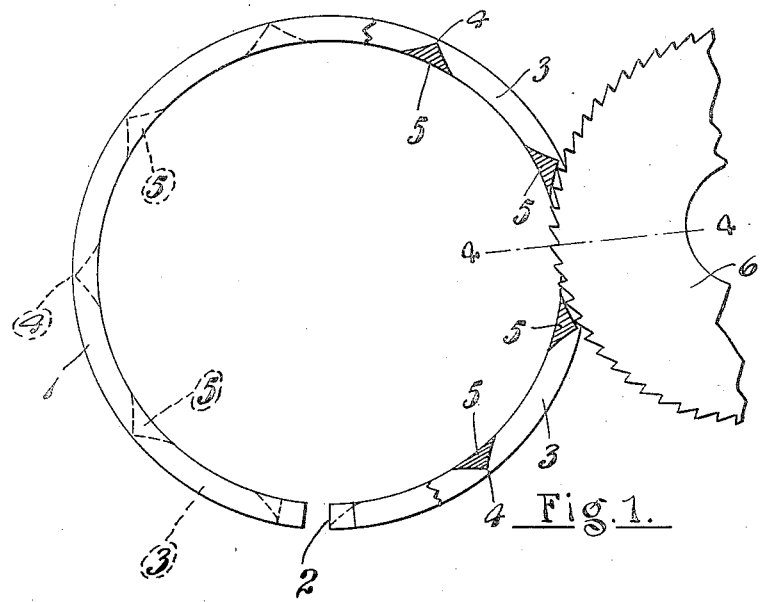
Figure 2:
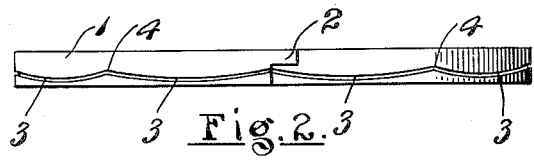
Fig. 2 is an elevation of the piston ring.
Figure 3:
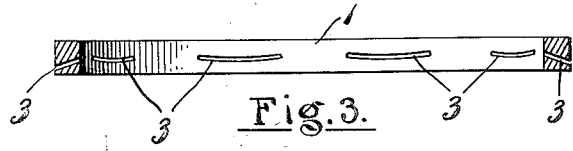
Fig. 3 is a vertical section therethrough.

So far described, the piston ring is a complete ring of the "snap" type and is a very practical and satisfactory ring. My invention contemplates taking rings of this character and producing slots therethrough sawed by a metal cutting saw from the outside inward at a plurality of points, the saw being set at an angle to the plane of the ring whereby the slots incline upwardly and inwardly from the outside to the inner side of the ring. The slots 3 cut by the saw are cut in consecutive order around the ring, one saw cut or slot at its ends overlapping the ends of the adjacent slots 3, as indicated at 4, there being a continuous groove of varying depth around the ring which at regular spaced intervals extends through the ring to the inner side, the slots on the inner side being shorter than at the outer side, there being substantially triangular sections 5 between adjacent slots, as shown in Fig. 1. This follows from the circular shape of the saw 6 and the circular shape of the ring 1 with which it is used.

Figure 4:
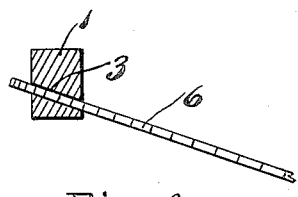
Fig. 4 is a vertical section through one side of the piston ring, showing the way that the slots are cut therein, and the approximate angle of the saw with respect to the plane of the ring.

Preferably, the saw is disposed at an angle to the plane of the ring, as shown in Fig. 4. As thus located, the slots 3 cut thereby curve upwardly at each end from the mid-point of each slot and the groove around the ring comprises a connected series of scallops. Also the slots 3 cut in the ring extend upwardly and inwardly at an angle to the horizontal, and the edge between the upper side of the slot and the outer curved side of the ring is rendered more sharp due to the acute angle made between said sides of the slot and ring.

Figure 5:
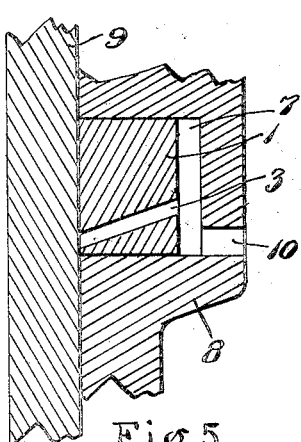
Fig. 5 is a fragmentary enlarged vertical section through a wall of a cylinder and adjacent parts of a piston and ring carried thereby.
Figure 6:
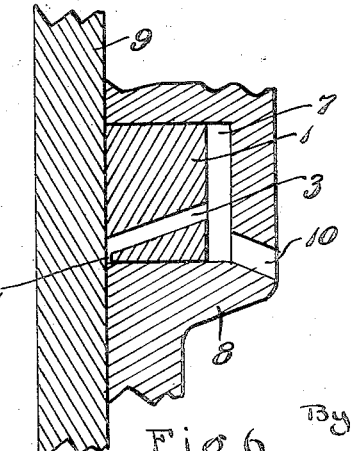
Fig. 6 is a view similar to Fig. 5, showing a slight difference in the piston ring construction.

The rings are designed to be placed in ring grooves, as 7 (Figs. 5 and 6) formed in pistons 8 so as to bear against the inner sides of the cylinder walls 9 of an internal combustion engine. As the piston moved up and down in the cylinder, the oil which may be adhering to the walls is scraped from the walls passing through the slots 3 to the ring grooves 7 back of the rings. If desired, an outlet opening 10 may be made through the piston from the ring grooves to the inside of the piston.

It will be noted that the scalloped form of the slots 3 coupled with their upward and inward inclination makes not only an acute scraping edge, but that the upward curve of each slot from its middle toward each end accentuates the scraping action, giving a shearing as well as a scraping action whereby excess of oil is completely removed from the cylinder walls. In the slightly different construction shown in Fig. 6, a small portion of the metal of the ring is removed below the groove formed by the slots 3, as indicated at 11, this aiding the oil scraping action through providing a larger space in which the oil may be collected. However, the construction shown in the other figures of the drawing is satisfactory and works in practice exceptionally well for the attainment of the ends for which it is made. The invention is defined in the appended claims and is to be considered as comprehensive of all structures and methods coming within their scope.

I claim:

1. A piston ring of substantially circular outline having a plurality of slots cut therein from its outer curved side to its inner curved side, said slots being cut upwardly and inwardly at an angle and having ends joining whereby a continuous groove of varying depth is made around the ring with a plurality of openings in spaced relation extending through the ring from said groove.

2. A piston ring of substantially circular outline having a plurality of slots cut therein from its outer curved side to its inner curved side, said slots at the outer curved side of the ring being of scalloped form having end portions curved upwardly each way from their middle points, substantially as described.

3. A piston ring of rectangular cross section and substantially circular outline having a plurality of slots cut therein around the ring from its outer curved side to its inner curved side, said slots being cut upwardly and inwardly at an angle to the horizontal and being longest at the outer side of the ring and decreasing in length to the inner side of said ring, the ends of adjacent slots joining to form a continuous groove around the ring.

4. A piston ring having a plurality of slots cut therein from the outer curved side inwardly to the inner curved side, said slots having ends joining and overlapping at the outer side of said ring, the portion of the ring below the said slots at the outer side of the ring being removed for a short distance back, substantially as described.

In testimony whereof I affix my signature.

CHARLES E. JOHNSON.